US009002272B2

(12) United States Patent
Friedlaender

(10) Patent No.: US 9,002,272 B2
(45) Date of Patent: Apr. 7, 2015

(54) METHOD, APPARATUS, AND USE OF PRESENCE DETECTION TO CONTROL A FUNCTION OF A DEVICE REQUIRING A PAIRING SECURITY LEVEL

(76) Inventor: Daniel Friedlaender, San Diego, CA (US)

( * ) Notice: Subject to any disclaimer, the term of this patent is extended or adjusted under 35 U.S.C. 154(b) by 690 days.

(21) Appl. No.: 13/023,107

(22) Filed: Feb. 8, 2011

(65) Prior Publication Data

US 2011/0195665 A1    Aug. 11, 2011

Related U.S. Application Data

(60) Provisional application No. 61/302,360, filed on Feb. 8, 2010.

(51) Int. Cl.
*H04B 7/00* (2006.01)
*H04M 1/725* (2006.01)
*G08C 17/02* (2006.01)
*H04W 12/06* (2009.01)
*H04W 8/00* (2009.01)

(52) U.S. Cl.
CPC ........... *H04M 1/72577* (2013.01); *G08C 17/02* (2013.01); *G08C 2201/20* (2013.01); *G08C 2201/91* (2013.01); *H04M 1/7253* (2013.01); *H04M 2250/02* (2013.01); *H04W 12/06* (2013.01); *H04W 8/005* (2013.01)

(58) Field of Classification Search
CPC ......... G06F 1/3231; G06F 2221/2129; H04W 12/06; H04W 12/08; H04W 76/02; H04W 48/08; H04W 48/16; H04W 76/028; H04W 8/005; H04L 63/0428; H04L 63/107; H04M 1/72577
See application file for complete search history.

(56) References Cited

U.S. PATENT DOCUMENTS

| 6,367,020 | B1 | 4/2002 | Klein |
| 6,401,209 | B1 | 6/2002 | Klein |
| 7,376,669 | B2 | 5/2008 | Klein |
| 2002/0056046 | A1 | 5/2002 | Klein |
| 2002/0099960 | A1 | 7/2002 | Klein |

(Continued)

OTHER PUBLICATIONS

Bluetooth Specification V3.0 + HS (Specification of the Bluetooth System, Wireless Communications Made Easy), Apr. 21, 2009, Bluetooth SIG, vol. 0-5, pp. 1-1712.*
Chang, et al. "Formal Analysis of Authentication in Bluetooth Device Pairing", The University of Texas at Austin, 2007.
Usability Expert Group, "Bluetooth Secure Simple Pairing User Terminology", Revision V1.0, Aug. 9, 2007, 12 pgs.

*Primary Examiner* — Nay A Maung
*Assistant Examiner* — Alejandro Rivero
(74) *Attorney, Agent, or Firm* — Mark D. Wieczorek; Mayer & Williams PC

(57) ABSTRACT

The system and method provide for a small, low-power device, e.g., a Bluetooth® device, in a carryable or wearable form, that allows a controlled device to respond to the presence of the user. The device may be worn on one's person and allow other devices, by means of Bluetooth® pairing and protocols, to detect the presence of a user. The controller or controlling device may emit a signal in the vicinity of the user to allow the controlled device to know whether or not the controlling device is present, and the signal may be a pulse of data that is transmitted every few seconds. The pulse of data between the transmitter and the receiver may be encrypted to be used for higher-security applications as a means of dual-factor authentication. The presence of the user may be employed to control a device, e.g., to control access to a computer, to unlock/lock doors, to turn lights on and off, and so on.

20 Claims, 13 Drawing Sheets

(56) References Cited

U.S. PATENT DOCUMENTS

| | | |
|---|---|---|
| 2006/0128305 A1* | 6/2006 | Delalat .................. 455/41.2 |
| 2007/0186105 A1 | 8/2007 | Bailey et al. |
| 2007/0277230 A1 | 11/2007 | Hawkins et al. |
| 2008/0069105 A1 | 3/2008 | Gosta et al. |
| 2009/0006846 A1* | 1/2009 | Rosenblatt ................ 713/159 |
| 2010/0022217 A1 | 1/2010 | Ketari |
| 2010/0056055 A1* | 3/2010 | Ketari ..................... 455/41.3 |
| 2011/0215921 A1* | 9/2011 | Ben Ayed et al. ........ 340/539.11 |

* cited by examiner

METHOD, APPARATUS, AND USE OF PRESENCE DETECTION TO CONTROL A FUNCTION OF A DEVICE REQUIRING A PAIRING SECURITY LEVEL

CROSS-REFERENCE TO RELATED APPLICATIONS

This application claims benefit of priority of U.S. Provisional Patent Application Ser. No. 61/302,360 filed Feb. 8, 2010 entitled "METHOD AND APPARATUS FOR APPLICATIONS OF Bluetooth® PRESENCE DETECTOR" incorporated by reference herein in its entirety.

FILING OF COMPUTER PROGRAM LISTING

A filing containing a computer program listing appendix is included along with this application. The materials in this filing are incorporated by reference in this application in their entirety. The filing includes a computer code listing pertaining to an exemplary Level I embodiment as that term is used in the specification below.

FIELD OF THE INVENTION

The invention relates to automatic control of devices, and in particular to control and security functionality for devices using components that may be carried by a user.

BACKGROUND OF THE INVENTION

Security of computers and the data thereon is a growing concern. For example, when a user leaves a computer workstation, they may occasionally lock their computer in various ways, including by activating a screensaver. Upon their return, a password must be entered to continue using the computer. In some cases, this has been made more convenient, such as by allowing a user to activate a screensaver by moving their cursor to a particular location on their screen. However, some affirmative action is still required.

In addition, the growing cost of energy has given new emphasis and focus on energy-saving devices. Consumers can save significant amounts of energy by turning off unneeded appliances, such as lights. However, turning off these appliances requires an affirmative step.

Some efforts have been made at ameliorating these deficiencies. In the case of computers, screensavers may rely on a timer: once the user has been idle for a certain number of minutes, the computer activates the screensaver. In the case of lights, motion sensors and timers have been employed. Using these, if no movement has been detected in a room for certain period of time, the lights will turn off.

While these systems work to an extent, in both cases they simply assume the absence of a user. Consumers cannot rely on having their computer time out if there is sensitive data on them. In the case of the motion sensor and timer system, the same often encounter false positives, which are annoying and distracting for users.

More sophisticated attempts have also been made. For example, the BlueProximity system, an application for Linux, allows a certain amount of control of devices. However, the same employs regular Bluetooth® pairing. A disadvantage is that, once paired, a user cannot use their phone or the computer's Bluetooth® for other purposes. If they attempt to, the connection is dropped, and the computer initiates its screensaver. The system provides a "pause mode," but this mode must be manually entered each time. In addition, of course, managing multiple devices is generally not allowed. The system cannot generally drop the first connection, so anything else requiring authentication is unable to do so.

SUMMARY OF THE INVENTION

The system and method provide for a small, low-power device, e.g., a Bluetooth® device, in a carryable or wearable form, that allows a controlled device to respond to the presence of the user. The device may be worn on one's person and allow other devices, by means of Bluetooth® pairing and protocols, to detect the presence of a user, and the same is accomplished by both devices generally having a pre-set relationship with each other, although in some cases no pre-set relationship may be necessary. In some cases, the user may carry the controlling device on their person a significant amount of the time. The controller or controlling device may emit a signal in the vicinity of the user to allow the controlled device to know whether or not the controlling device is present, and the signal may be a pulse of data that is transmitted every few seconds, periodically or aperiodically. The pulse of data between the transmitter and the receiver may be encrypted to be used for higher-security applications as a means of dual-factor authentication.

Implementations of the system and method may be particularly useful as part of a platform technology upon which developers can create applications using an appropriate software development kit.

Various types of controlling devices may include a kinetic-powered wristwatch that can generate its own power, although of course battery power may also be employed; a pin such as a lapel pin, which may employ variable power sources; a software emulator running on a cell phone, or the like. In the emulator case, generally no additional hardware is required. Other transmitters may also be employed so long as the same are capable of transmitting a signal to a receiving or controlled device. In a Bluetooth® implementation, advantage may be taken of many users' carrying their mobile phone at all times as well as the fact that cell phones already often have the necessary components for Bluetooth® connectivity.

Various applications may include: software to cause computers to enter a certain operating mode, e.g., an idle mode, if the user leaves the vicinity, or to enter a mode where a user must enter a password upon their return for security. The system may be employed to operate on a user preference profile, to adjust the same upon detection of an authorized user. The system may be employed to idle a user's computer when they walk away to save power as well as to disable the reception of instant messages or the like while they are away. Of course, variations of the above will be seen. For example, the system may be employed to enable an "out of office" message upon receipt of instant messages or e-mails.

In other implementations, the system may be employed to save energy by turning off lights when a user has left a room. The system may be employed to pause the playback of movies or shows when a user leaves a viewing area, and may start playback of the same upon the user's return. The system may be employed to authenticate a user at an ATM or other such secure location. The system may be employed to unlock a door when a user is within a certain proximity to the door, and may lock the door otherwise.

While many types of transmission schemes may be employed, one benefit of Bluetooth® is its low power and short-range (between 1-10 meters) characteristics, as well is its ubiquity throughout many types of technology. Since Bluetooth® is relatively inexpensive, small in form factor, has a well-documented specification, which is well-defined and convenient to develop for, and operates on an FCC-unregulated frequency spectrum, it would be particularly convenient for companies to manufacture appropriate items for the present implementations, e.g., light switches, DVD players, digital video players, or high-security applications.

Because the Bluetooth® specification allows for encrypted links between devices, device according to the present implementations can act as an authentication tool, in addition to a password or other means of authentication, when accessing protected areas. When the two devices set up their first relationship, they will generally exchange long and random encryption keys. Every subsequent time these two devices interact, these keys will be re-exchanged to establish a connection and authenticate the user.

When the devices establish their initial relationship, the device to be paired, i.e., the controlled device or circuit, may assert a pairing security level required of the wearable device, i.e., the controller, controlling device or circuit. The pairing security level may be, e.g., level I, II, or III, and these levels may then designate the security required of future connections. For example, a level I pairing security level may be such that connections are initiated and terminated solely on the basis of Bluetooth® addresses. This type of pairing security level may be particularly appropriate for light switches and other lower security items. A level II pairing security level may be appropriate for situations where a device requires encryption to establish a connection, but where it is acceptable for the pair to revert to an unencrypted, address-based checking to maintain and terminate the connection. In other words, a level II pairing security level may start off encrypted but become a level I pairing security level. This type of pairing security level may be particularly appropriate for a personal computer. A level III pairing security level may apply for higher-security situations. In this pairing security level, the two devices swapping their link keys, and form an encrypted connection, which must remain encrypted or the connection is terminated. This type of pairing security level would be appropriate for a computer with sensitive information or a lock into a house. Of course, it will be understood by one of ordinary skill in the art given this teaching that other levels may also be employed, and other applications may also be the subject of implementations of the invention.

The levels are employed for various reasons, including that different applications require different levels of security. In a Bluetooth® implementation, it is noted that the Bluetooth® specification usually only allows for one encrypted Bluetooth® connection per module. Thus, if encryption is required, it is useful to start with an encrypted pair but transform the pairing to address based checking if possible, leaving room for additional encrypted pairings to occur, either persistent encrypted pairings or transient encrypted pairings. Additional details are described below.

Besides dedicated devices, the system and method may be implemented in software that runs on, e.g., a mobile phone or PDA. In this way, the mobile phone would emulate the dedicated device, and all the above functionality described for the device would be available. In this implementation, no additional hardware would be required and the software may be easily downloaded from various services.

In one aspect, the invention is directed towards a system for controlling a device, including: a controller, the controller including at least a first non-transitory computer-readable medium, the first non-transitory computer-readable medium including instructions for causing the controller to perform the following steps: broadcasting a plurality of sequential signals, the sequential signals indicating at least a device address of the controller; receiving a broadcasted signal from a controlled device, the broadcasted signal from the controlled device indicating at least a device address of the controlled device and a pairing security level required of the pairing relationship with the controlled device; determining if the controller and controlled device have established a prior pairing relationship; if the controller and controlled device have established a prior pairing relationship, then re-establishing a pairing relationship, whereby the controlled device is caused to enter a first operating mode; and if the controller and controlled device have not established a pairing relationship previously, then attempting to establish a pairing relationship between the controller and the controlled device; where if the attempt is successful, then establishing a pairing relationship between the controller and controlled device, the pairing relationship associated with the pairing security level, whereby the controlled device is caused to enter the first operating mode, such that upon the absence of a received broadcasted signal from the controller, the controlled device enters a second operating mode; and where if the authentication is unsuccessful, then not establishing a pairing relationship between the controller and controlled device; and a controlled device, the controlled device including at least a second non-transitory computer-readable medium, the second non-transitory computer-readable medium including instructions for causing the controlled device to broadcast a signal indicating at least a device address of the controlled device and a pairing security level required of the pairing relationship with the controlled device; such that, if the controller and the controlled device establish a pairing relationship, the pairing relationship is associated with the pairing security level, and where the pairing security level is either an unencrypted connection based on device addresses or an encrypted connection.

Implementations of the invention may include one or more of the following. The controller may include a controlling circuit where the controlling circuit includes a signal transmitter, and the controlled device may include a controlled circuit where the controlled circuit includes a signal receiver. The controlling circuit may secure the controlled circuit, or an application running on a system including the controlled circuit, against unauthorized access. The controlling circuit may be configured to be wearable by a user. The signal transmitter may be configured to send an encryption key to the controlling circuit. The signal transmitter and the signal receiver may operate using a Bluetooth® transmission scheme. The controlling circuit and the controlled circuit may be configured to be in signal communication when the distance between the signal transmitter and the signal receiver is less than 15 feet. The controlling circuit may form a portion of a dedicated device. The controlling circuit may form a portion of a watch, a PDA, or a mobile phone. The instructions for causing the controller to perform steps may form a portion of an application for a PDA, tablet computer, or mobile phone.

In another aspect, the invention is directed towards a system for controlling a device, including: a first Bluetooth® device; and a second Bluetooth® device, the second Bluetooth® device performing a function when paired with the first Bluetooth® device; such that if the second Bluetooth® device asserts a first pairing security level requiring only a Bluetooth® address, and if the first Bluetooth® device pairs with the second Bluetooth® device, then the second Bluetooth® device is caused to perform the function; and such that if the second Bluetooth® device asserts a second pairing security level requiring encryption, and if the first Bluetooth® device pairs with the second Bluetooth® device using encryption, then the second Bluetooth® device is caused to perform the function.

Implementations of the invention may include one or more of the following. If the second Bluetooth® device asserts a second pairing security level requiring encryption, and if the first Bluetooth® device pairs with the second Bluetooth® device using encryption, then the second Bluetooth® device may be caused to perform the function and then to change the pairing security level to the first pairing security level. If the second Bluetooth® device asserts a third pairing security level requiring encryption, and if the first Bluetooth® device pairs with the second Bluetooth® device using encryption, then the second Bluetooth® device may be caused to perform the function and then to maintain the pairing security level at the third pairing security level. The invention may further include that, during a time when the pairing security level is maintained at the third pairing security level, a presence of a third Bluetooth® device requesting pairing with the second Bluetooth® device at a second or third pairing security level may be detected, and the pairing security level of the first and second paired Bluetooth® devices may be lowered to the first pairing security level for a predetermined period of time, e.g., between 5 and 30 seconds. The first Bluetooth® device may be a Bluetooth®—enabled pin, a Bluetooth®—enabled watch, or a Bluetooth®—enabled mobile phone. The second Bluetooth® device may be a computer, and the function may be to allow access to the computer, or a light, and the function may be to turn on the light, or a door, and the function may be to unlock or allow access to the door.

In another aspect, the invention is directed towards a system for controlling a device, including: a controlled device, the controlled device including at least a non-transitory computer-readable medium, the non-transitory computer-readable medium including instructions for causing the controlled device to broadcast a signal indicating at least a device address of the controlled device and a pairing security level required of a pairing relationship with the controlled device, such that, if the controlled device establishes a pairing relationship with a controller, the pairing relationship is associated with a pairing security level, and the pairing security level is either an unencrypted connection based on device addresses or an encrypted connection.

In another aspect, the invention is directed towards a system for controlling a device, including: a controller, the controller including at least a first non-transitory computer-readable medium, the first non-transitory computer-readable medium including instructions for causing the controller to perform the following steps: broadcasting a plurality of sequential signals, the sequential signals indicating at least a device address of the controller; receiving a broadcasted signal from a controlled device, the broadcasted signal from the controlled device indicating at least a device address of the controlled device and a pairing security level required of the pairing relationship with the controlled device; determining if the controller and controlled device have established a prior pairing relationship; if the controller and controlled device have established a prior pairing relationship, then re-establishing a pairing relationship, whereby the controlled device may be caused to enter a first operating mode; and if the controller and controlled device have not established a pairing relationship previously, then attempting to establish a pairing relationship between the controller and the controlled device; where if a pairing relationship is established, the pairing relationship associated with a pairing security level, the controlled device is caused to enter the first operating mode, such that upon the absence of a received broadcasted signal from the controller, the controlled device enters a second operating mode; such that, if the controller and the controlled device establish a pairing relationship, the pairing relationship is associated with the pairing security level, and the pairing security level is either an unencrypted connection based on device addresses or an encrypted connection.

In another aspect, the invention is directed towards a method of controlling a device, including: attempting to establish a pairing relationship between a controller and a controlled device; if the controller and the controlled device establish a pairing relationship, where the pairing relationship is associated with a pairing security level, and where the pairing security level is either an unencrypted connection based on device addresses or an encrypted connection, the pairing security level chosen based on a pairing security level asserted by the controlled device, causing the controlled device to enter a first operating mode; and if the controller and the controlled device become separated by greater than a first proximity the pairing relationship may be destroyed, causing the controlled device to enter a second operating mode.

Implementations of the invention may include one or more of the following. If the pairing security level is an encrypted connection, then the method further includes causing the encrypted connection to become unencrypted. The method may further include causing the encrypted connection to become unencrypted for a predetermined period of time, and may further include causing the unencrypted connection to become encrypted.

Advantages of certain implementations of the invention may include one or more of the following. Implementations may provide for a level of automatic security for controlled devices, e.g., computers may enter inoperable operating modes if a user is not present. Implementations of the invention may also provide for a significant level of automatic energy-saving, e.g., a user may configure the system such that lights, heating, audio or video playback and so on, turn off upon the user leaving the area. Implementations of the invention may further provide a high level of convenience for the user, allowing the user significant control over devices and circuits with virtually no required input from the user.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

The foregoing, together with other features, embodiments, and advantages of the present invention, will become more apparent when referring to the following specification, claims, and accompanying drawings.

DETAILED DESCRIPTION

In the following description, for the purposes of explanation, specific details are set forth in order to provide a thorough understanding of the invention. However, it will be apparent that the invention may be practiced without these specific details. The words "data" and "information" are used interchangeably.

In the system, a link, e.g., via Bluetooth®, may be established using an unencrypted pairing, or encryption may be used either only initially or throughout the entire connection. The controlled device, e.g., a computer, may then perform a function, e.g., behave in a standard or first operating mode, as long as the user is within a predetermined proximity following authentication. The level of predetermination necessary may vary. In some cases the predetermined proximity distance is simply determined by the characteristics of the paired devices. In other implementations, the predetermined proximity may be at least in part controlled by a user. In any case, if the user exceeds the predetermined proximity, the connection is lost due to the two devices being out of range. Thus, in this situation, the controlled device performs various actions, such as becoming inoperable or entering a different or second operating mode. The link may be reestablished by proximity being restored.

In one exemplary implementation, a controlled device includes a Bluetooth® transceiver, or module. The same may contain a device such as a CSR BlueCore chip, as well as an antenna to broadcast or transmit the signal, where the signal may contain a device address, a pairing security level, or other data. The controlled device may contain flash memory, e.g., for the instruction set and for the Bluetooth® protocol data, as well as a microcontroller which has memory to store the addresses/keys of the devices with which it has paired. In some cases, an RF switch may be employed to turn on and off the Bluetooth® module. A button may be provided to initiate the pairing process. Finally, a power supply may be employed. In one exemplary implementation, a controller may employ certain of the above components as well, along with a screen and a UI to input data so that the user can pair the correct devices, as well as so that the user can enter any initial identification codes during pairing.

Figure 1:
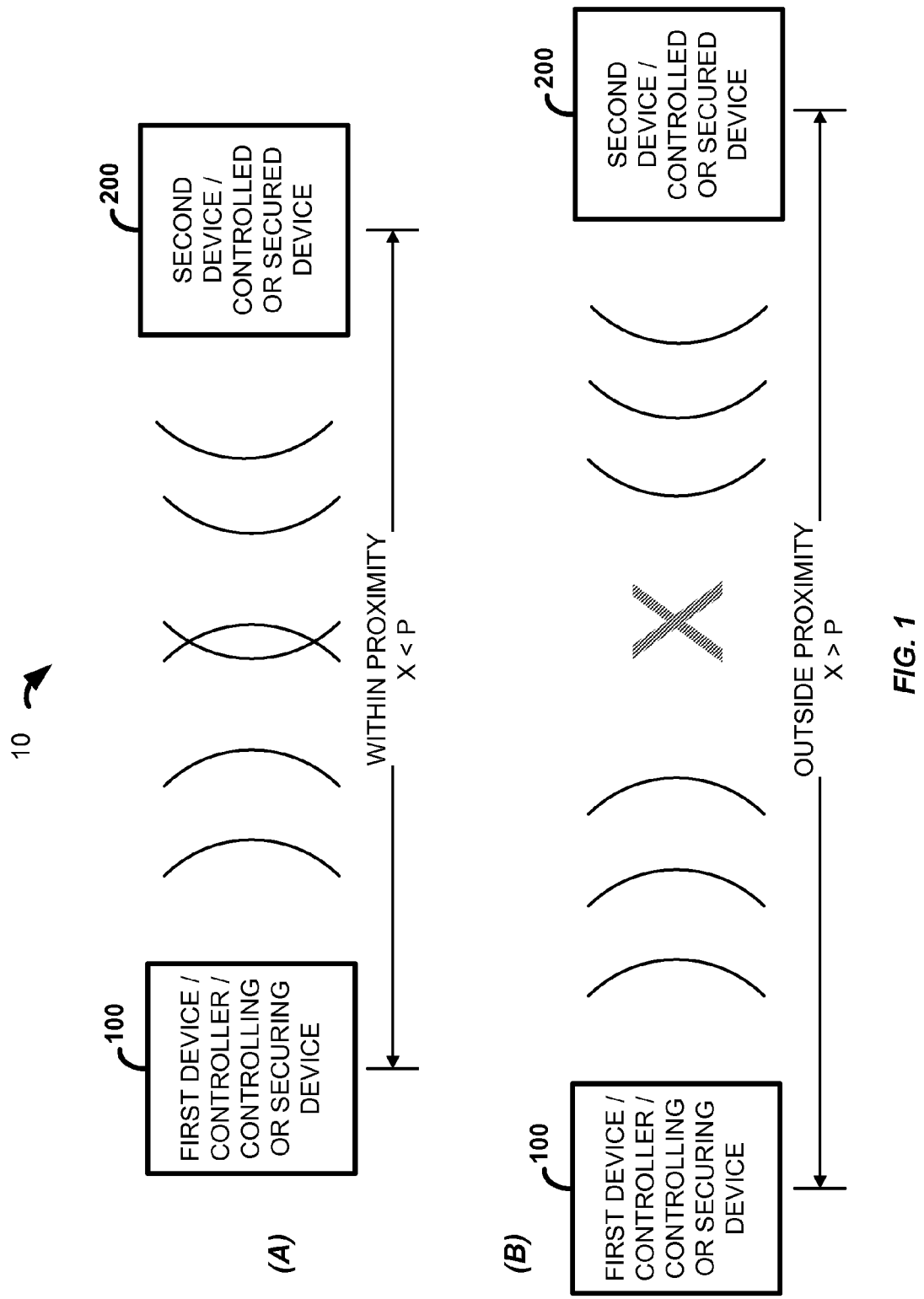
FIGS. 1(A)-(B) illustrates schematically the effect of proximity between a first device and a second device, i.e., between a controller and a controlled device.

Referring to FIGS. 1(A)-(B), a schematic illustration is shown depicting the effect of proximity between a first device and a second device, i.e., between a controller and a controlled device. In FIG. 1(A), a system 10 includes a first device 100 that is shown within a proximity X<P of a second device 200. The first device 100 is also called a securing or controlling device or just a controller. In some implementations, the controller may be a dedicated device or may be a multipurpose device or may be implemented as software running on the same. The second device 200 is also called a controlled or secured device. The controlled device 200 may also include software that operates to at least in part fulfill the purposes and principles described here. Of course, one of ordinary skill in the art will understand that the same may be implemented on a dedicated chip, in firmware, or the like.

Referring to FIG. 1(B), the situation is shown where the controller 100 is outside the proximity distance P. In this case, information or signal communication may be impossible between the controller and the controlled device and in this case the controlled device may be caused to enter an operating mode or state different from that when the controller is within the proximity distance P. It will be understood that the proximity distance P is not necessarily where no signal is communicated or measurable, but rather where the signal is either too low to provide signal communication or is below a predetermined threshold configured by the system.

Figure 2:
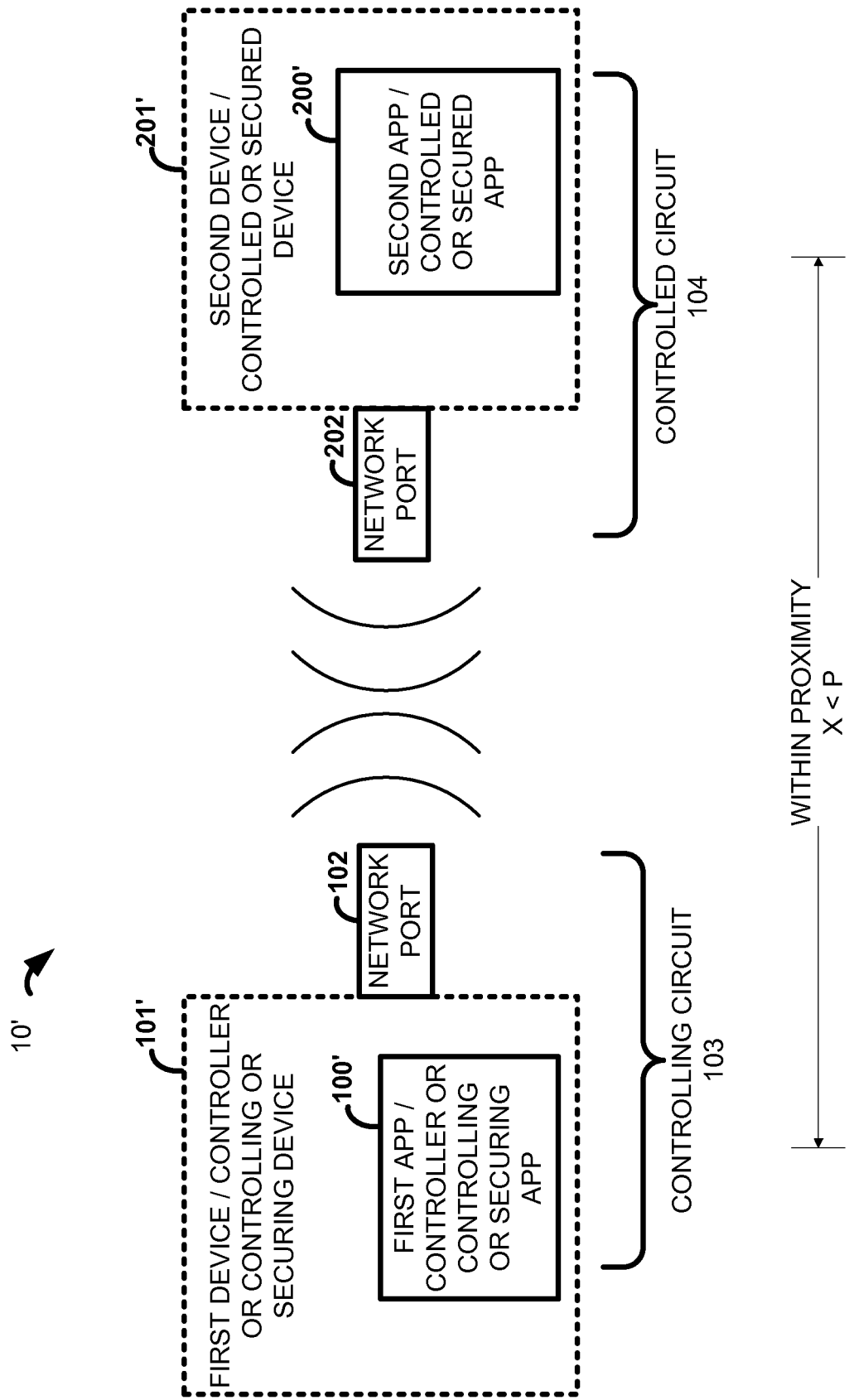
FIG. 2 illustrates another implementation of a system, in this case where the controller or controlling device and the controlled device include applications stored on computer-readable media which implement methods according to the principles described.

Referring to FIG. 2, an implementation of a system is illustrated where the controller or controlling device 101' and the controlled device 201' include applications stored on computer-readable media which implement methods according to the principles described. In this case, the system 10' includes a controller 101' and a controlled device 201', but in this case the controller 101' includes a first non-transitory computer-readable medium 100', which serves as a controller or controlling or securing application. The controller 101' also includes a network port 102, and the combination of the controller 100' and the network port 102 comprises a controlling circuit 103. In the same way, the controlled or secured device 201' includes a network port 202, as well as a second application, i.e., a controlled application 200'. The combination of the controlled application 200' and the network port 202 are referred to as a controlled circuit 104.

It is noted that in some contexts, the controller may be considered to be the controlling application, e.g., a computer-readable medium comprising instructions for performing a method of controlling a device. In other words, the term controller or controlling device or controlling circuit can refer to the application as stored on the computer-readable medium. The same is true of the second application and the controlled device or controlled circuit.

Figure 3:
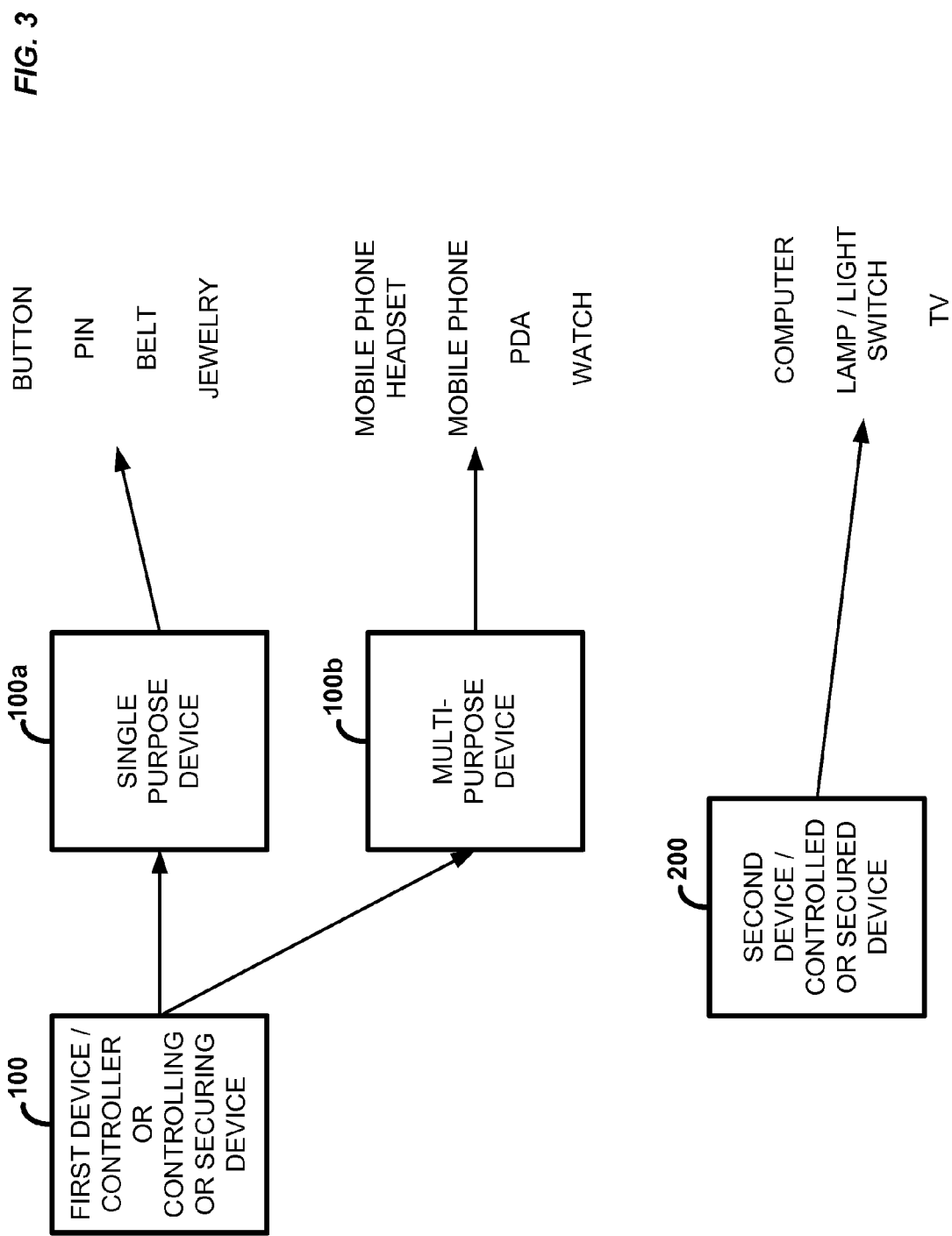
FIG. 3 illustrates exemplary types of controllers and controlled devices.

Referring to FIG. 3, exemplary types of controllers and controlled devices are shown. For example, the controller 100 may be a single-purpose device 100a, such as a button, pin, belt, or piece of jewelry. Alternatively, the controller 100 may be a multipurpose device 100b, such as a mobile phone headset, a mobile phone, a personal digital assistant or PDA, or a watch. The controlled device 200 may be a computer, a lamp or light switch, a television, a door lock, or the like. It should be noted that the above examples should be considered in no way limiting. One of ordinary skill in the art will recognize, by virtue of this teaching, numerous devices that may be controlled in this way, as well as numerous devices in which such controllers may be situated. Of course, it will be recognized that in addition to proximity activating a device, the lack of proximity can also be employed to activate a device.

Figure 4:
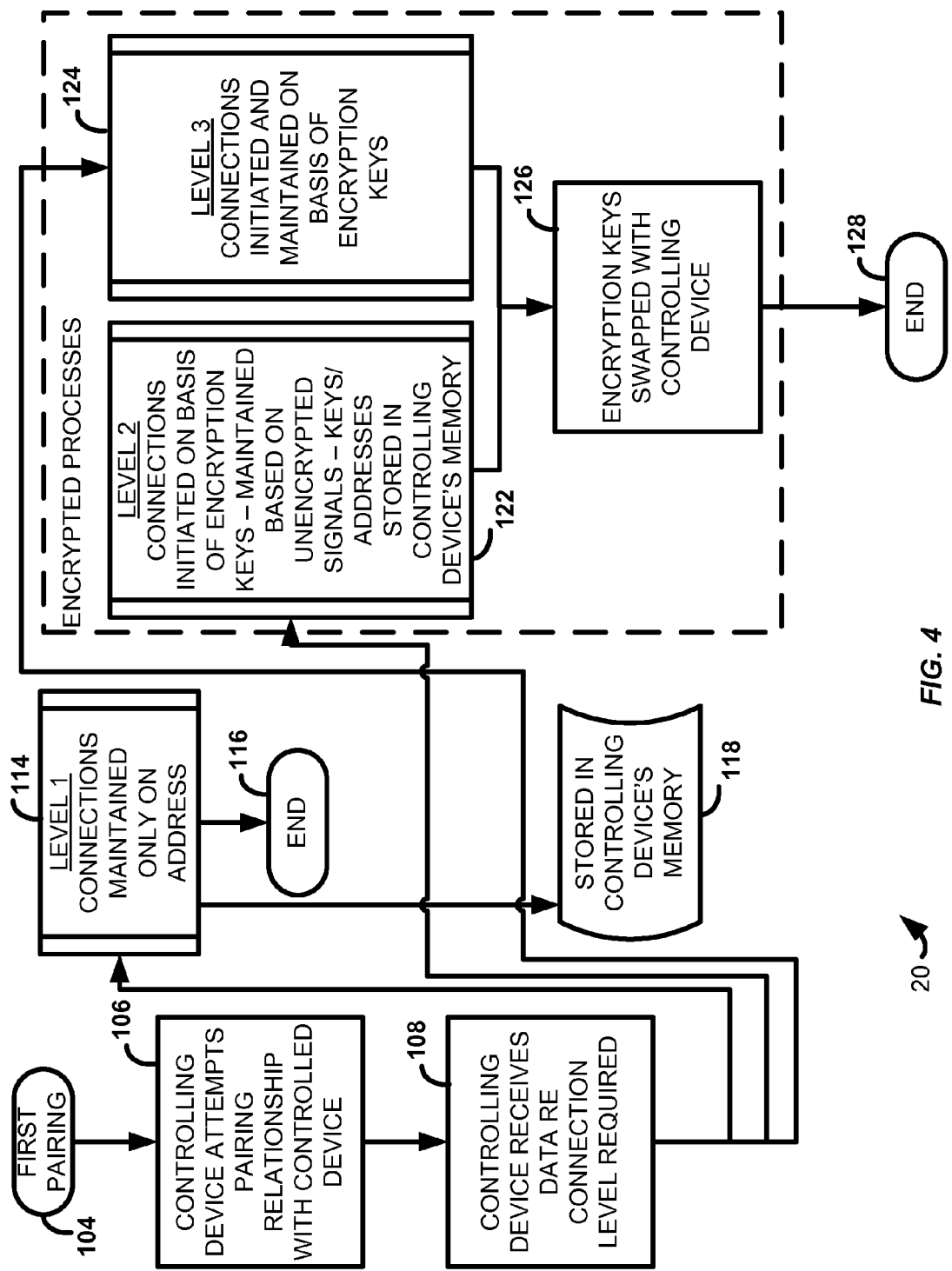
FIG. 4 is a flowchart according to one implementation of a method according to the principles described.

Referring to FIG. 4, a flowchart 20 according to one implementation of a method is illustrated. A first step starts with the initiation of a first pairing (step 104). In this step, a controlling device or controller attempts pairing with a controlled device (step 106). For example, a user with a controller may approach a computer after they have been away for a break and attempt to use the same. The user may initiate the pairing attempt, e.g., by pushing a button on one or both devices, or the devices themselves may automatically initiate the same. The controlling device or controller then receives data regarding the connection level required (step 108). In this step, the controller receives information about a pairing security level required for the establishment of a successful pairing relationship. Different pairing relationships are useful for different situations.

If the controlled device asserts, broadcasts, or transmits a relatively lower security pairing security level, then a more simple pairing relationship may ensue. For example, such pairings are termed level I in this specification. This type of connection may be maintained only by each device knowing the address of the other, e.g., a Bluetooth® address. Of course, one of ordinary skill in the art will recognize that, given this teaching, other data besides addresses may be employed. Moreover, the language of levels is used as a convenient nomenclature, but of course any hierarchical system may be employed. In any case, once the level I connection is established (step 114), the method may end (step 116) until the connection is terminated by user proximity or until another pairing relationship is attempted. It is also noted that once the level I pairing relationship is established, data may be stored (step 118) in the controller or in the controlling device, or both, about the address of the other device. In this way, knowledge is gained of the other device and a pairing relationship may be reestablished based on the address information alone when the controller and controlling device next connect.

In this exemplary implementation, if the connection is not a level I connection, then encrypted processes are used. For example, if the controlled device asserts, broadcasts, or transmits a pairing security level requiring level II, than connections between the controller and the controlled device may be initiated on the basis of encryption keys in known fashion. However, such connections may be maintained and based on unencrypted signals, e.g., keys or addresses stored in the controlling device's memory (step 122). In another example, if the controlled device asserts, broadcasts, or transmits a pairing security level requiring level III, than connections between the controller and the controlled device may be initiated on the basis of encryption keys in known fashion. In this case, however, such connections may be maintained and based on encrypted signals, e.g., keys or addresses stored in the controlling device's memory (step 124). In either case, encryption keys are swapped between the controller and the controlled device (step 126), although in the level II case, reversion to the level I pairing security level or the like is then performed. Once the swapping is accomplished, this part of the method may end (step 128).

Figure 5:
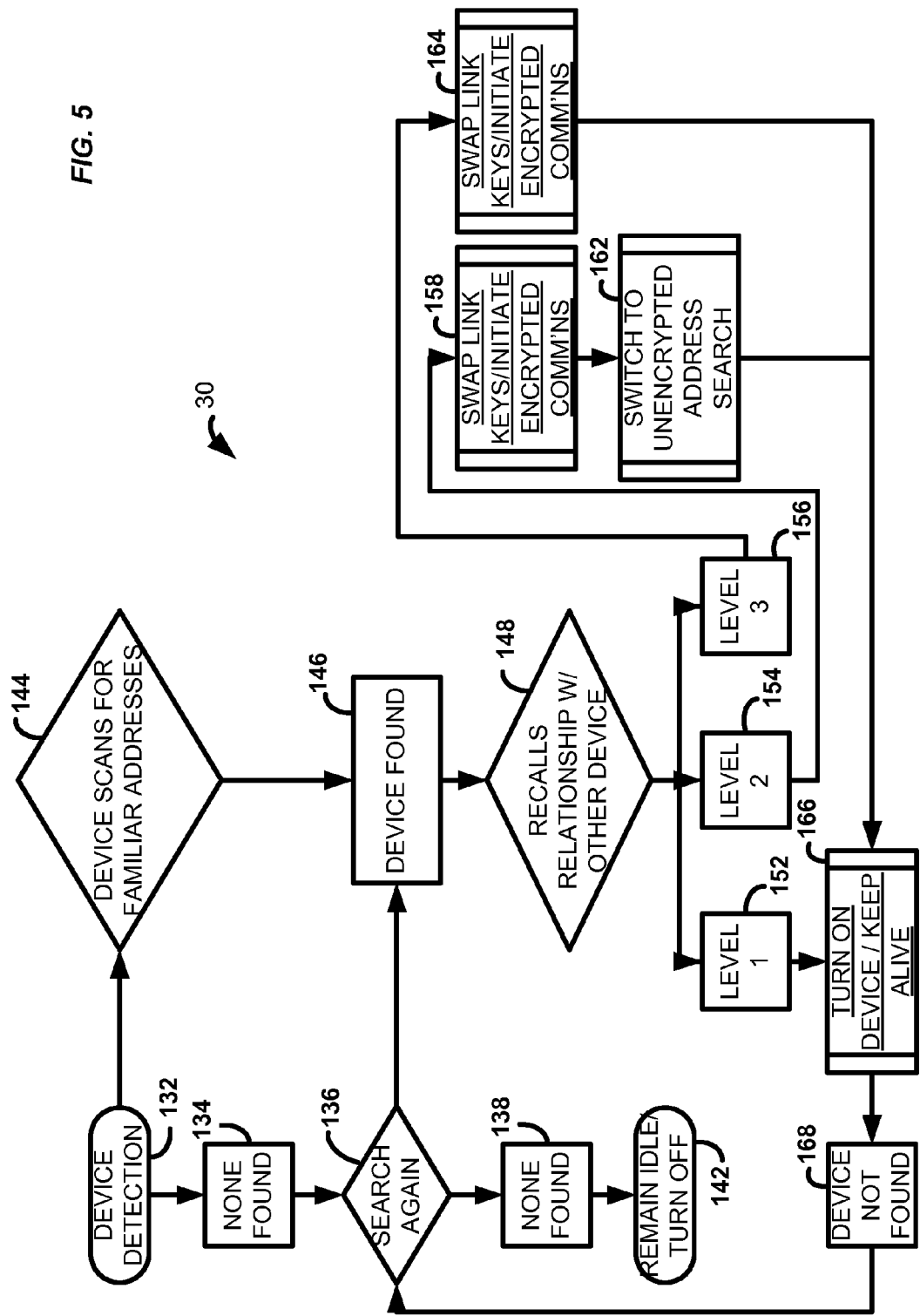
FIG. 5 is a flowchart according to another implementation of a method according to the principles described.

Referring to FIG. 5, a flowchart 30 according to another implementation of a method is illustrated. In this method, an initial step of device detection (step 132) starts by a device scanning for familiar addresses, i.e., those for which a pairing relationship has been previously established or those for which a pairing relationship could potentially be established. In this and other implementations, one variety of device scans that may be employed are those employed in Bluetooth® wireless transmission schemes. Thus, in this implementation, the device may scan for familiar Bluetooth® addresses (step 144). If none are found (step 134), the search may simply be performed again (136). If no familiar addresses continue to be detected (step 138), then the device may remain idle or turn off (step 142). If a device is found (step 146), then the controller and controlled device may attempt to recall their relationship (step 148). Alternatively, the controlled device may assert a pairing security level that the controller may then attempt to match or exceed. In the case of a level I pairing security level (step 152), the controlled device may enter a first operating mode, such as by turning on, keeping active, or the like (step 166). In the case of a level II pairing security level (step 154), link keys may be swapped and encrypted communications initiated (step 158). In the level II case, however, the connection then switches to an unencrypted one, such as may be based on addresses alone (step 162). In the case of a level III pairing security level (step 156), link keys may be swapped and encrypted communications initiated (step 164), and later reduced to a level I pairing security level. In the level III case, however, encryption must be maintained for the device to continue to be in the active or operable state.

The connection may be maintained in any of the levels until a time when the device is no longer found (step 168). Such may be the case when the user, e.g., wearing the device, becomes out of proximity to the controlled device. In this case, flow passes to the searching step (step 136), to search for the next device.

Figure 6:
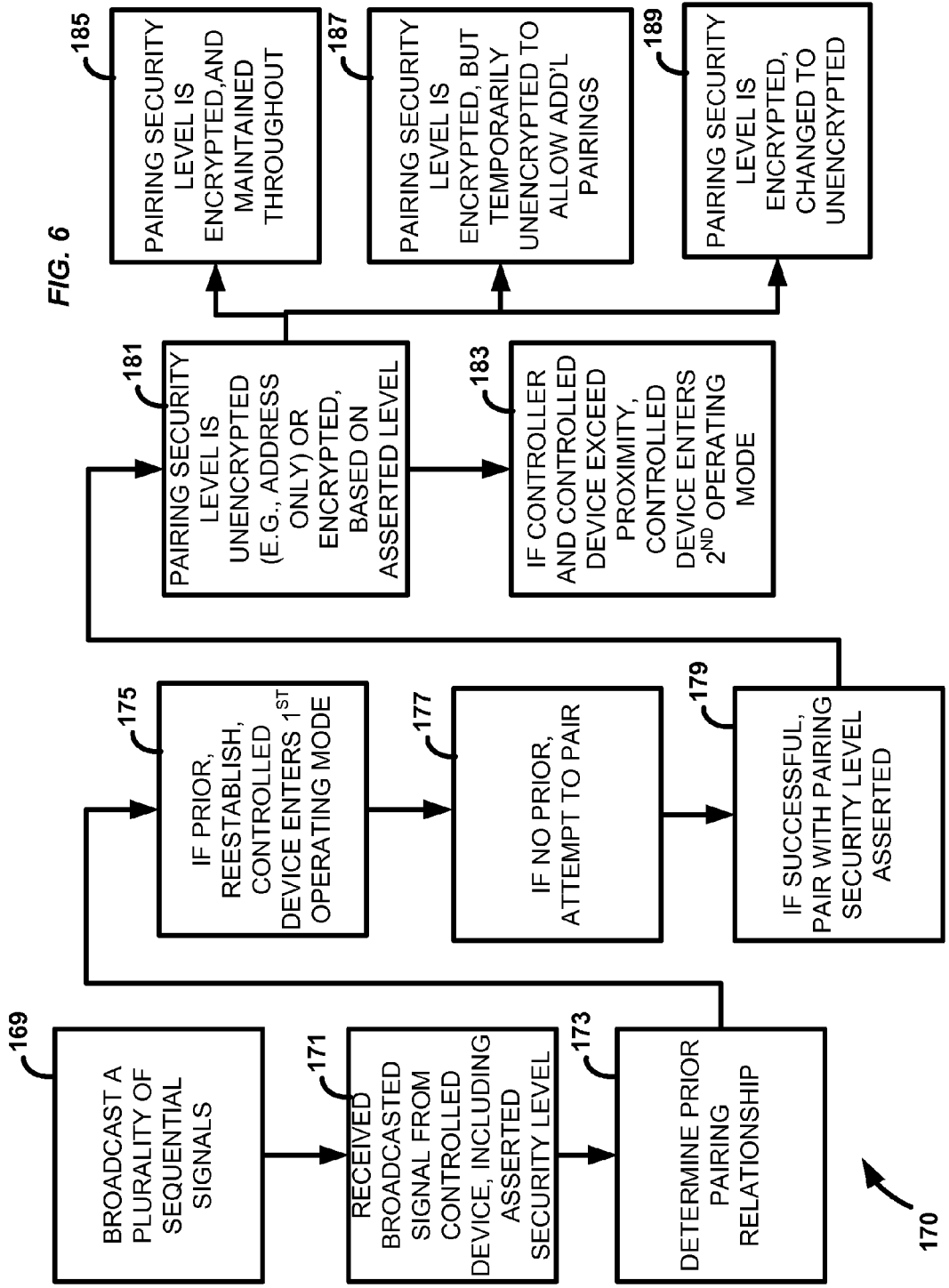
FIG. 6 is a flowchart according to another implementation of a method according to the principles described.

Referring to FIG. 6, a flowchart 170 according to another implementation of a method is illustrated. This method may be particularly useful for controllers, controlling devices, and controlling circuits. A first step is for the controller to broadcast a plurality of sequential signals (step 169). This step may be performed in a custom fashion, in which a plurality of signals are transmitted or broadcast in an effort to find devices to pair with. However, in another implementation, signals may be transmitted according to, e.g., standard Bluetooth® protocols. The sequential signals may be periodic or aperiodic, and in many cases will indicate at least a device address of the controller. A next step is to receive a broadcasted signal from a controlled device (step 171). In this step, data may be received from a controlled device, e.g., one the controller may establish a pairing relationship with, and this data may include the device address and the pairing security level required.

A next step is to determine if a prior pairing relationship has been established between the controller and the controlled device (step 173). If a prior pairing relationship has been established, then the same may be reestablished (step 175). And the controlled device may enter a first operating mode. For example the controlled device may become operable, turn on, or any number of other functions may be performed based on the configuration that has been set. If no prior pairing relationships have been found, then the controller and controlled device may attempt to pair, i.e. establish a pairing relationship (step 177). In a Bluetooth® implementation, this may include the input of identification codes into one or both devices and the swapping of keys, as well as storage of addresses to enable future reestablishment of pairing. If the authentication and pairing are successful, then the devices will pair with the pairing security level asserted and required by the controlled device (step 179). The pairing security level may be associated with unencrypted communications or encrypted communications (step 181). If encrypted, various possibilities may ensure, and in this implementation three branches are shown in flowchart 170. Similar to the above, in a level III scenario, the pairing security level is encrypted and the same is maintained throughout the duration of the pairing relationship between the controller and the controlled device (step 185). In a level II scenario, the pairing security level is encrypted, but is changed to unencrypted after a period of time (step 189). In an additional embodiment, the pairing security level may be encrypted, but the same may be temporarily unencrypted to allow additional pairings (step 187). This aspect is discussed in greater detail below.

If the controller and the controlled device exceed the proximity distance, then the controlled device enters a second operating mode (step 183). The method may then repeat with steps 169 and 171. It is noted that in this description the terms "enter a first operating mode" and "perform a function" are used in a similar way, depending on context.

As noted above, the controller may include a controlling circuit where the controlling circuit includes a signal transmitter, and the controlled device may include a controlled circuit, where the controlled circuit includes a signal receiver. The controlling circuit may be configured to be wearable by a user. The signal transmitter may be configured to send an encryption key to the controlling circuit. Both the controller and the controlled device may employee the Bluetooth® transmission scheme. Bluetooth® provides various benefits, including known formats and protocols, and has an appropriate range, which may be chosen by the developer according to the needs of the system. For example, the controlling circuit and the controlled circuit may be configured to be in signal communication when the distance between the signal transmitter and the signal receiver is less than 15 feet, less than 10 feet, or the like.

As noted above, various types of connections may be employed, including various types of encrypted communications. These variations are discussed in greater detail here. Level I connections can coexist with other connection types, but level II and level III connections may generally be made in ascending order in order to coexist with each other. In other words, Level I connections can generally be established at any time, because when a device is discoverable, its address is always being broadcast. If two or more connections are being made, connections must be made generally with the Level II connections being made first, followed by the level III. As an example, it is noted that if two computers are adjacent, one using level II and another using level III to authenticate the user via his cell phone, if the user approaches the level III computer first, the computer will pair with the user's phone, and authenticate the user. Then if the user approaches the level II computer to authenticate, in order for level II to work, it also needs to pair with the phone. Though it can see the phone (the phone is still discoverable), the computer cannot connect because that would cause the level III connection to be dropped. And because level III connections must maintain a paired connection, that would cause the computer to enter a second or inoperable mode. Or, if the phone was configured to not drop the connection, the level II computer would not authenticate or successfully pair.

There are at least two solutions. In one, connections are made in ascending order. That is, if all of the level II connections are made first, they essentially pair and become level I connections. As noted above, Level I can be established at any time during this process. Once this step has been performed, the user may authenticate and pair a level III device.

In another solution, the security of level III is lessened temporarily, and this may be acceptable in certain cases. In this system, the user may specify that, on level III, a certain grace period may be provided for dropped connections. In the above example, if a level III connection was present and the user was intending to authenticate the level II computer, the user may define a time on the level III computer, say 5-30 seconds, e.g., 10 seconds, where the computer would tolerate a dropped connection without entering the second operating mode. In this fashion, the controlling device quickly authenticates the level II device and further remembers to immediately pair back to the level III device. Generally, the allotted time may be established by the controlled device or by the manufacturer.

Figure 7:
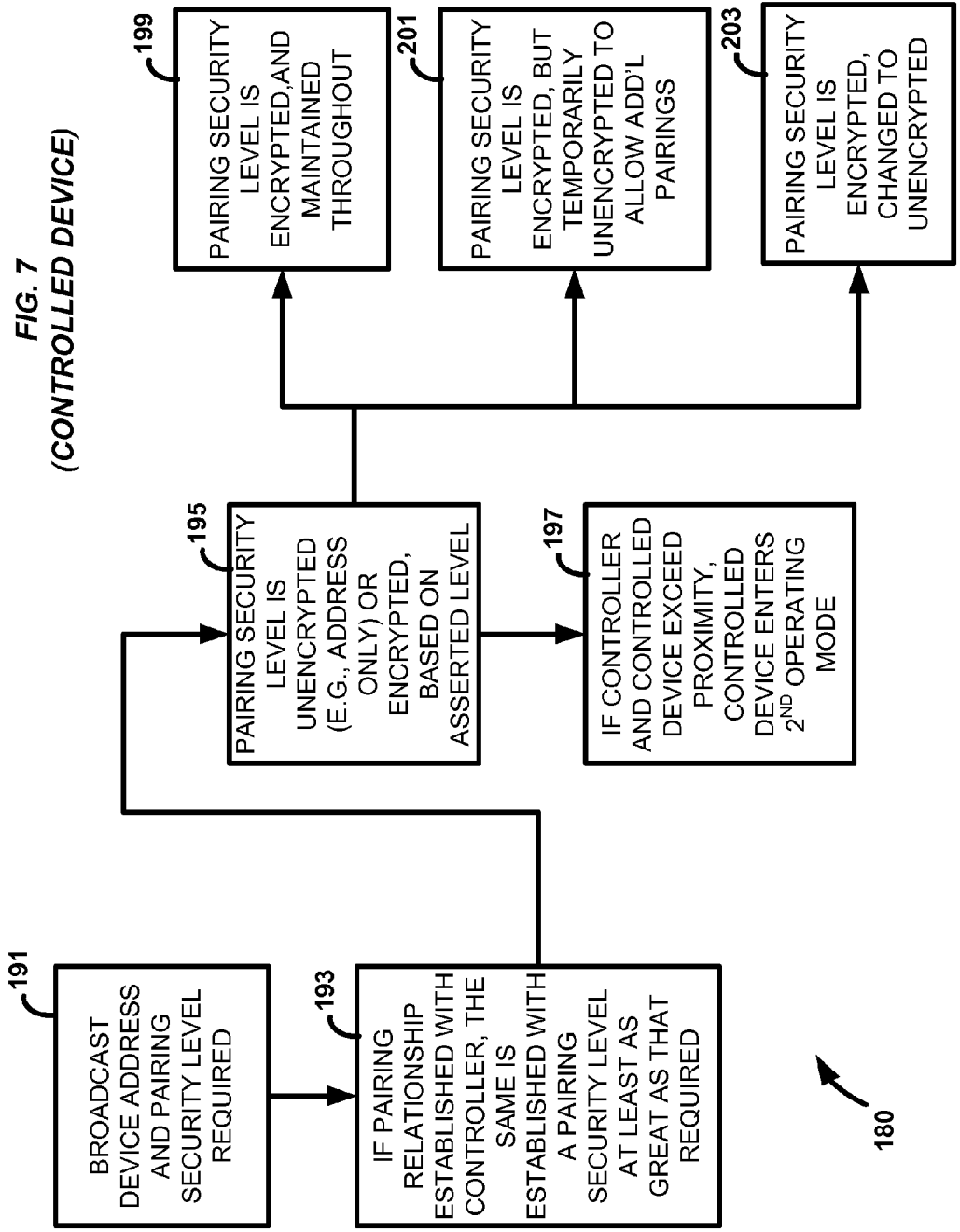
FIG. 7 is a flowchart according to another implementation of a method according to the principles described.

Referring to FIG. 7, a flowchart 180 according to another implementation of a method is illustrated. This method may especially pertain to the controlled device. In a first step, the controlled device broadcasts its device address and pairing security level required to pair (step 191). It will be understood that additional data may also be broadcast or transmitted. Moreover, in some cases, no device address need be transmitted. In addition, it is noted that the designer or manufacturer of the controlled device may in some cases only allow the controlled device to pair with a subset of pairing security levels. For example, a light switch manufacturer may only configure the light switch to perform a function, e.g., enter a first operating mode of turning on a light, at a level I pairing security level. The manufacturer of a computer for high security purposes may only configure the computer to enter a first operating mode of allowing access to the computer at a level III pairing security level. Of course, these are exemplary and alternatives will be also understood. A next step is to, if a pairing relationship is established with the controller, the pairing relationship is established with a pairing security level at least as great as that required by the controlled device (step 193). Typically, the pairing security level used will be the same as that required by the controlled device, but there may be situations in which a higher security level may be allowed or desired. The pairing security level is then employed for the pairing relationship (step 195), and the same may be unencrypted, e.g., based on address only, or encrypted, as required by the level asserted by the controlled device. As before, if the controller and the controlled device exceed the proximity distance, the controlled device then enters the second operating mode (step 197), which in many cases disallows interaction with the same. As above, for encrypted communications, the pairing security level may be encrypted and maintained throughout (step 199), may be encrypted but temporarily unencrypted to allow additional pairings (step 201), or maybe encrypted but changed to unencrypted (step 203).

Figure 8:
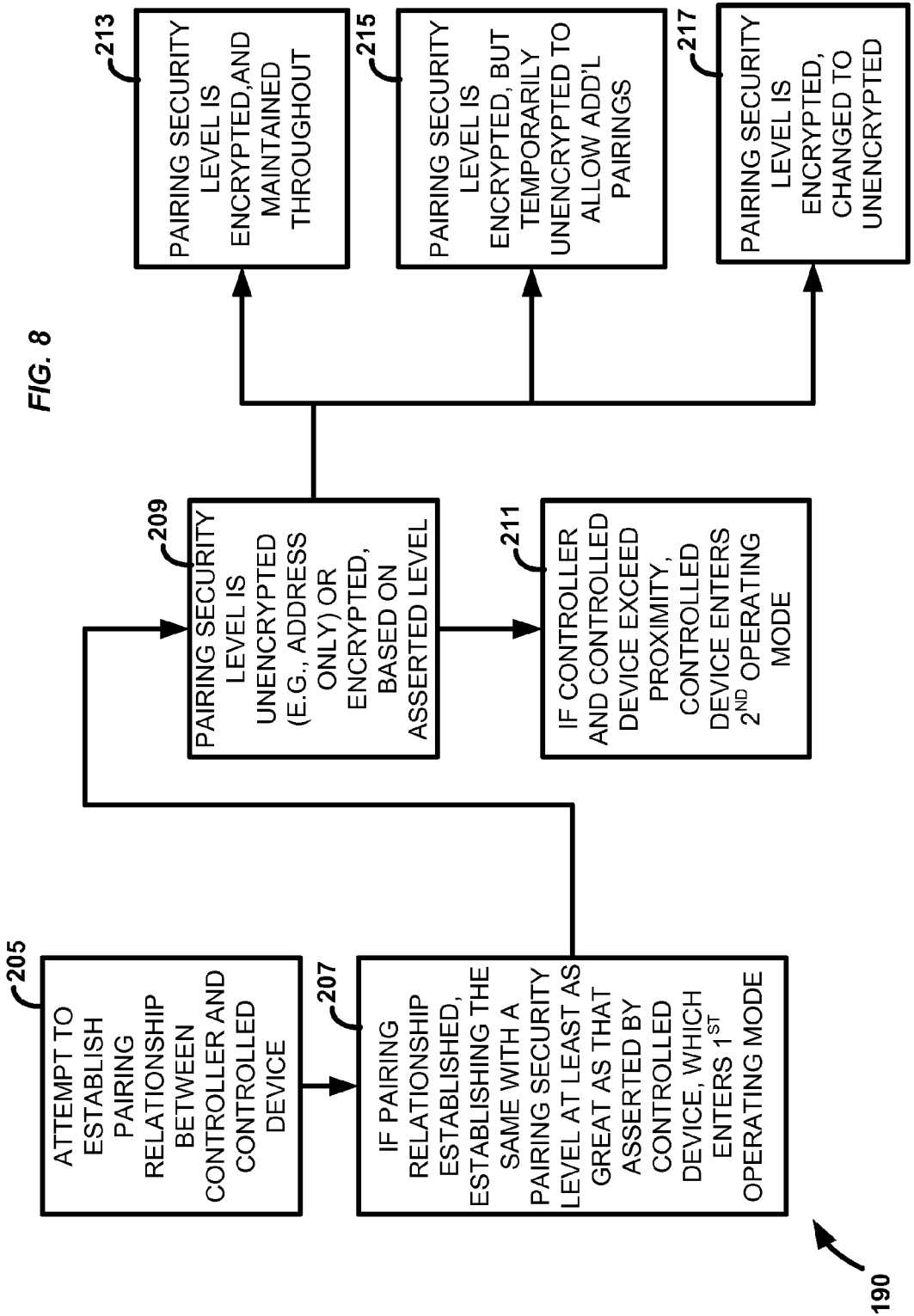
FIG. 8 is a flowchart according to another implementation of a method according to the principles described.

Referring to FIG. 8, a flowchart 190 according to another implementation of a method is illustrated. A first step of the method is to attempt to establish a pairing relationship between a controller and a controlled device (step 205). A next step is to, if a pairing relationship is established, establishing the pairing relationship with a paring security level at least as great as that asserted by the controlled device, which then enters a first operating mode (step 207). The pairing security level is then employed for the pairing relationship (step 209), and the same may be unencrypted, e.g., based on address only, or encrypted, as required by the level asserted by the controlled device. As before, if the controller and the controlled device exceed the proximity distance, the controlled device then enters the second operating mode (step 211), which in many cases disallows interaction with the same. As above, for encrypted communications, the pairing security level may be encrypted and maintained throughout (step 213), may be encrypted but temporarily unencrypted to allow additional pairings (step 215), or may be encrypted but changed to unencrypted (step 217).

Figure 9:
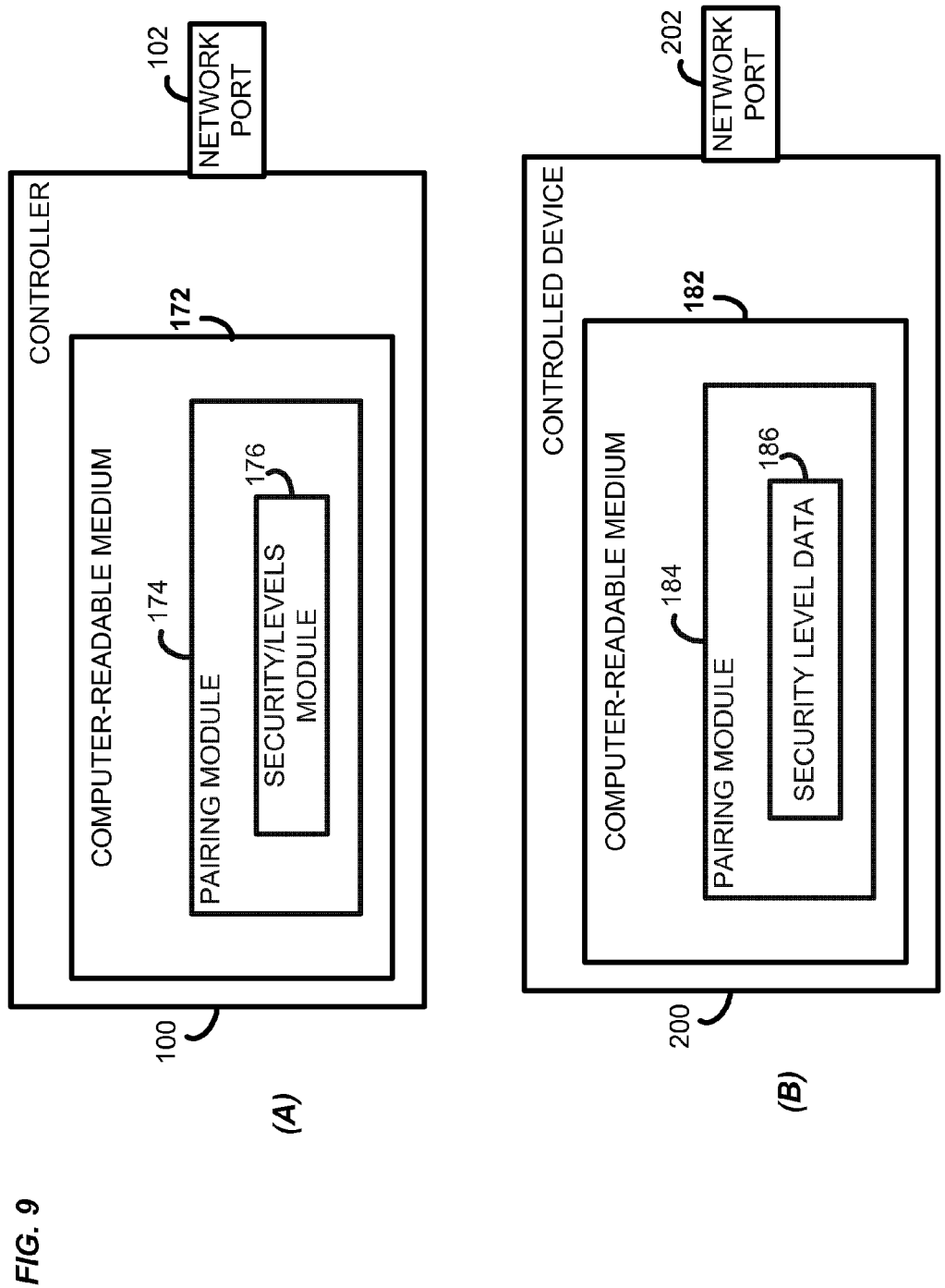
FIGS. 9(A)-(B) illustrates modular schematic diagrams of the controller and controlled device according to the principles described.

Referring to FIGS. 9(A)-(B), modular schematic diagrams are illustrated of the controller and controlled device according to the principles described. In FIG. 9(A), a modular depiction of a controller 100 is illustrated. The controller may include a computer-readable medium 172 and a network port 102. The network port 102 may be a signal transmitter as well as a signal receiver. For example, the network port 102 may allow for Bluetooth® transmission schemes. The controller 100 may be of the forms noted above, such as a pin, a watch, or an application running on a smart phone. In general, the controller 100 will include some sort of computer-readable medium 172 on which instructions may be encoded to perform a method according to the principles described in this specification. The computer-readable medium 172 will include a pairing module 174 and within the pairing module 174 a security/levels module 176. The module 176 contains instructions for the level configurations as described above, so as to allow level I pairing security levels, level II pairing security levels, and/or a level III pairing security level.

In FIG. 9(B), a controlled device 200 is illustrated that also includes a computer-readable medium 182 and a network port 202. As above, the network port 202 may allow for numerous transmission schemes, including Bluetooth®. The computer-readable medium 182 includes a pairing module 184 that allows the controlled device 200 to be in a pairing relationship with the controller 100. The pairing module 184 includes security level data 186, which may provide the level of security needed to pair with the controlled device, i.e., the pairing security level required by the controlled device.

The computer-readable media 172 and 182 as described above may be hard coded in firmware, as an ASIC, as microcode, as part of chip logic, stored in flash memory or on a hard drive, or in any other such non-transitory form.

Figure 10:
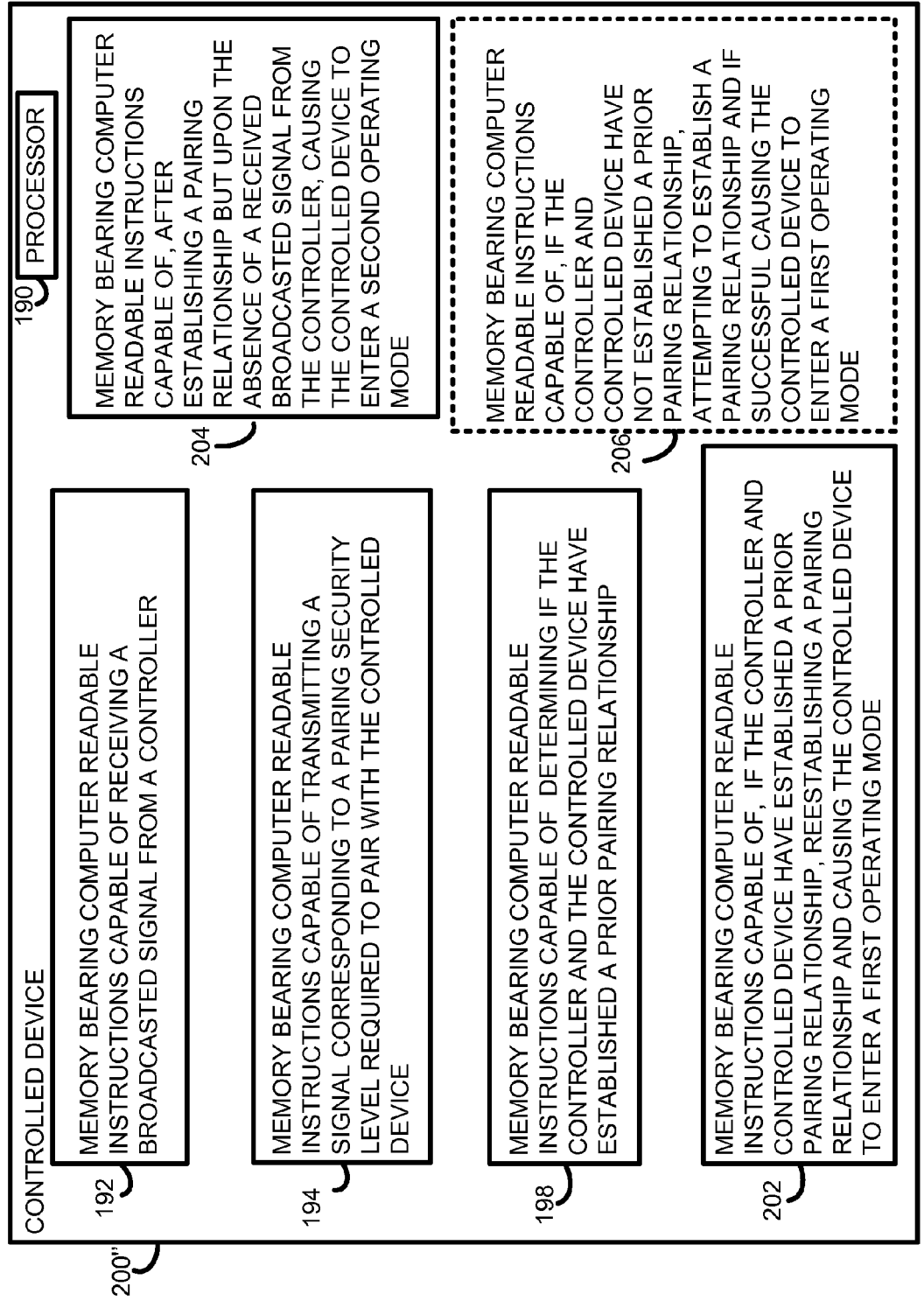
FIG. 10 is an exemplary depiction of a controlled device according to one implementation of the principles described.

Referring to FIG. 10, an exemplary depiction of a controlled device according to one implementation of the principles is described. In FIG. 10, the controlled device 200" includes a processor 190 and various memories bearing computer-readable instructions. The first such memory is memory 192 bearing computer-readable instructions capable of receiving a broadcasted signal from a controller. The controlled device 200" further includes memory 194 bearing computer-readable instructions capable of transmitting a signal corresponding to a pairing security level required to pair with the controlled device. As noted above, the memory 194 may allow for a multilevel system, with some levels having higher security than others. The controlled device 200" further includes memory 198 bearing computer-readable instructions capable of determining if the controller and the controlled device have established a prior pairing relationship. The controlled device 200" further includes memory 202 bearing computer-readable instructions capable of, if the controller and controlled device have established a prior pairing relationship, re-establishing a pairing relationship and causing the controlled device to enter a first operating mode, e.g., where the controlled device performs a function such as turning on, allowing access, becoming operable, or the like. The controlled device 200" further includes memory 204 bearing computer-readable instructions capable of, after establishing a pairing relationship, but upon the absence of a received broadcasted signal from the controller, causing the controlled device to enter a second operating mode. The controlled device 200" further includes optional memory 206 bearing computer-readable instructions capable of, if the controller and controlled device have not established a prior pairing relationship, attempting to establish a pairing relationship and if successful causing the controlled device to enter a first operating mode.

Figure 11:
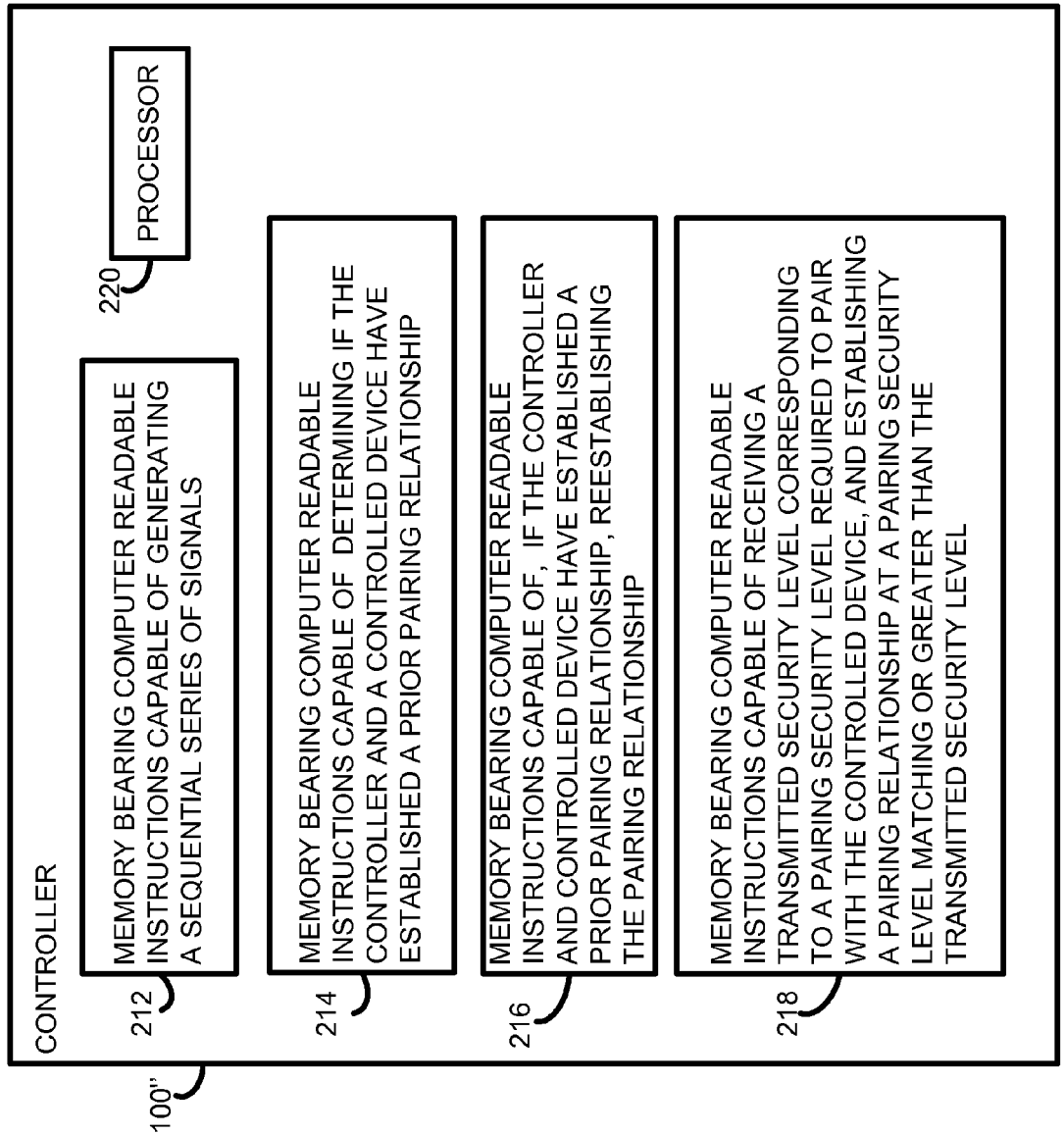
FIG. 11 is an exemplary depiction of a controller according to one implementation of the principles described.

Referring to FIG. 11, an exemplary depiction of a controller according to one implementation of the principles is described. In FIG. 11, the controller 100" includes a processor 220 and various memories bearing computer-readable instructions. The first such memory is memory 212 bearing computer-readable instructions capable of generating a sequential series of signals. The controller 100" further includes memory 214 bearing computer-readable instructions capable of determining if the controller and the controlled device have established a prior pairing relationship. The controller 100" further includes memory 216 bearing computer-readable instructions capable of, if the controller and controlled device have established a prior pairing relationship, re-establishing a pairing relationship and causing the controlled device to enter a first operating mode, e.g., where the controlled device performs a function such as turning on, allowing access, or the like. The controller 100" further includes memory 218 bearing computer-readable instructions capable of receiving a transmitted security level corresponding to a pairing security level required to pair with the controlled device, and establishing a pairing relationship at a pairing security level matching or greater than the transmitted security level. Generally at least two and often three levels will be provided, each providing a different level of security.

Figure 12:
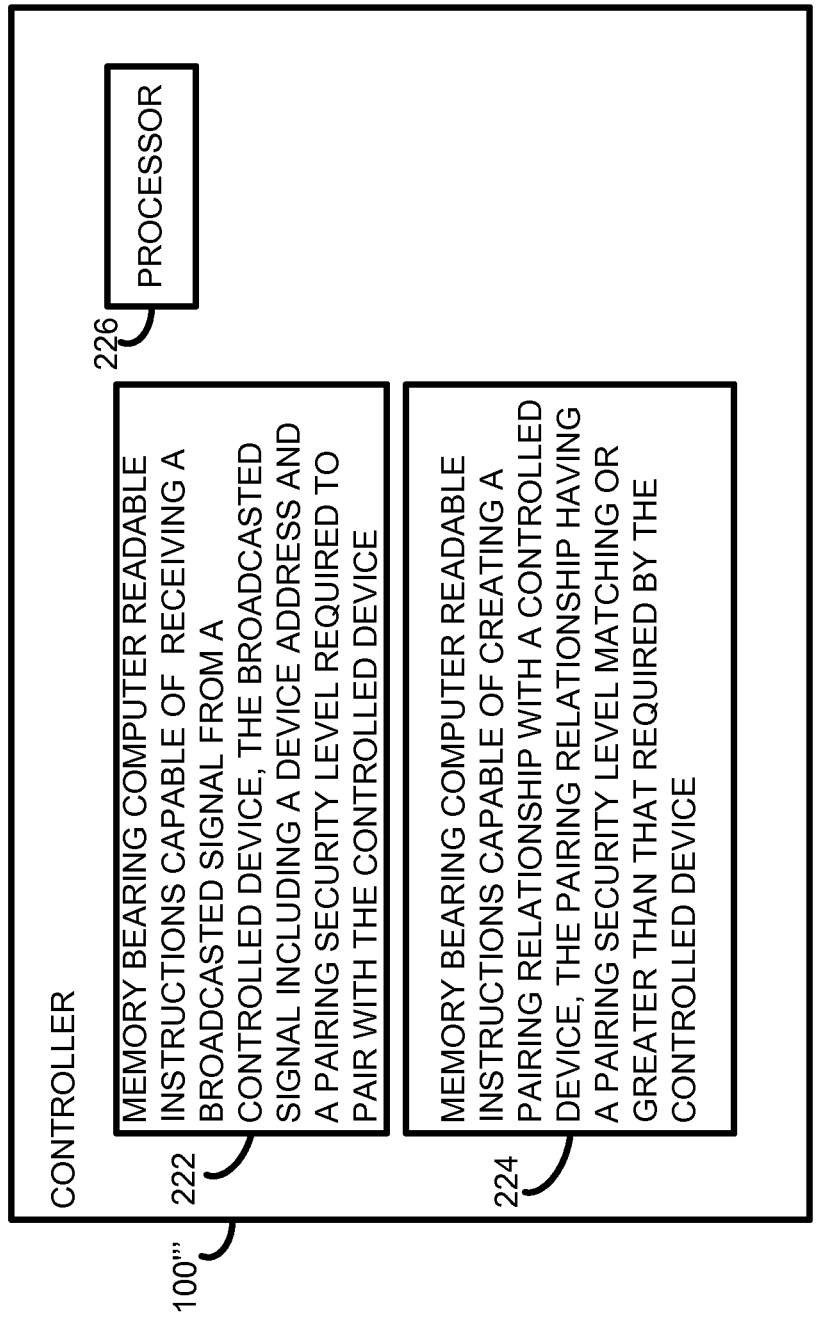
FIG. 12 is another exemplary depiction of a controller according to an implementation of the principles described.

Referring to FIG. 12, another exemplary depiction of a controller according to an implementation of the principles is illustrated. In FIG. 12, the controller 100''' includes a processor 226 and memory 222 bearing computer-readable instructions capable of receiving a broadcasted signal from a controlled device, the broadcasted signal including a device address and a pairing security level required to pair with the controlled device. Also in FIG. 12, the controller 100''' includes memory 224 bearing computer-readable instructions capable of creating a pairing relationship with a controlled device, the pairing relationship having a pairing security level matching or greater than that required from the controlled device. As noted above, generally at least two and often three levels are employed for optimal security.

Figure 13:
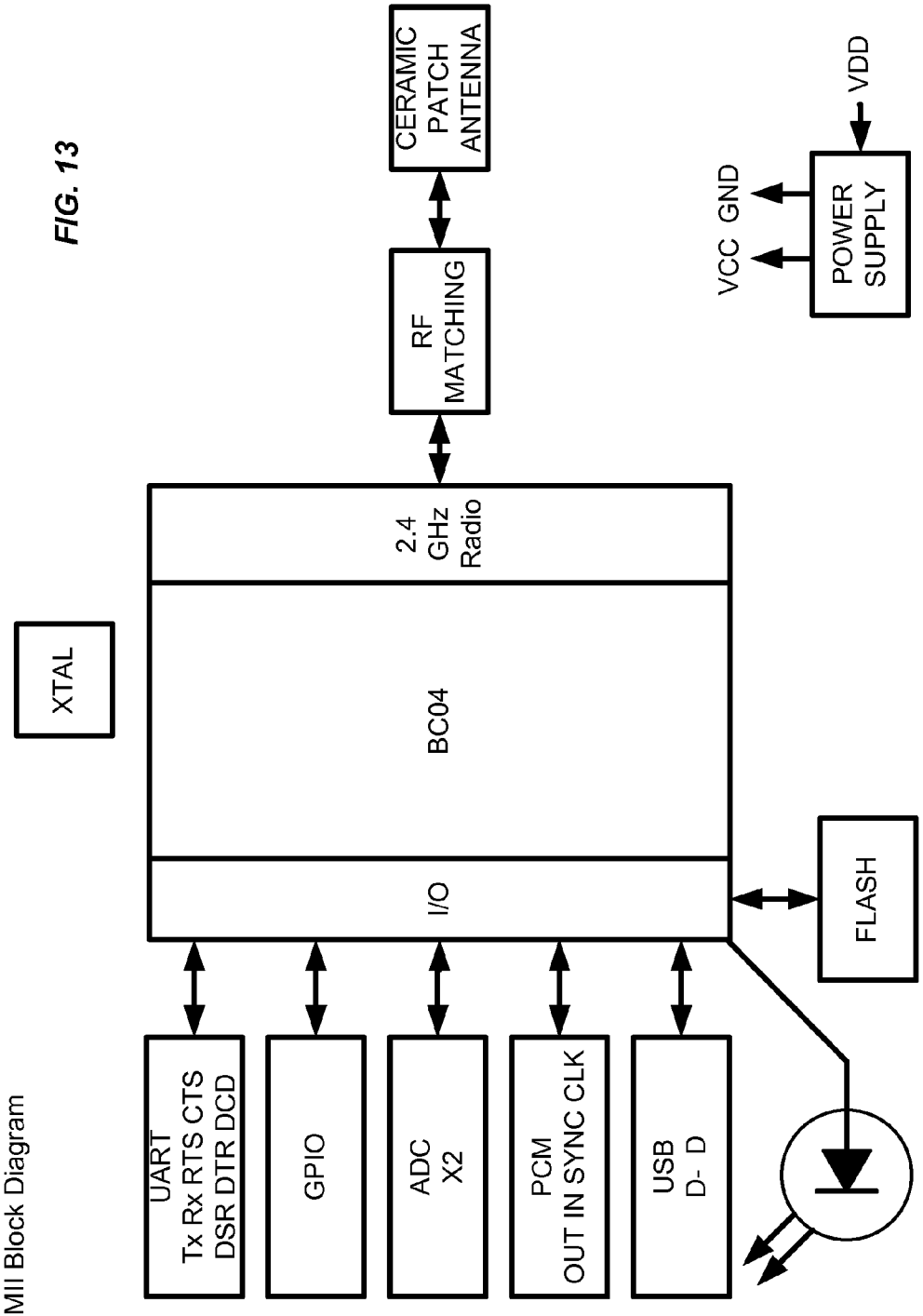
FIG. 13 is an exemplary depiction of a prototype layout of a system according to the principles described.

Referring to FIG. 13, an exemplary depiction of a prototype layout of a system according to the principles is illustrated. The layout includes a BC04 Bluetooth® chip connected through RF matching to a ceramic patch antenna, which can act as a receiver and a transmitter. The chip includes flash memory and a power supply. The chip can access sources of data and instructions via USB, PCM, and ADC, GPID, and UART.

Variations of the above will also be seen. For example, in some cases the manufacturer of a controlled device may desire to configure their device such that it only uses Level I or Level II. For example, a light switch maker may believe that their users only need Level 1. Alternatively, the manufacturer may simply desire to not allow a method to select between levels, so they may only incorporate the code for Level 1. However, the manufacturer may wish to incorporate some level of checking such that the devices to be paired the first time at least have the correct Bluetooth® address so that future pairings are more stable. In this way, the details of managing level II and III devices are omitted and thus less storage space is required on the light switch controlled device or controlled circuit.

In another variation, for controlling devices that are simpler in nature, hard-coded keys may be employed. In the case of more complex devices, like computers, a user may be enabled to specify their own codes to be employed in pairing and in creation of a later strong encryption key. In many cases, the same may be dictated by the user interface of the controlling device. In the case of the mobile phone, which has a screen and a keypad, a more complicated identification code may be established. In the case of a watch, a much more limited user interface is present, and thus identification codes will be similarly more limited. The same is true, with even more limitations, in the case of a user-worn pin.

In some particularly simple implementations, the controlled device may run some very basic code that may only include the knowledge of one level, depending on the manufacturer of the controlled device's desires for pairing.

In other variations, the system may be employed as an integral part of certain appliances, such as lights. In another embodiment, the system may be retrofitted onto existing lights by creating a "box" which plugs into the wall and also has an outlet for the controlled device to plug into. The box incorporates signal receiving functionality, such as the Bluetooth® functionality described above. A user approaching the box may be enabled to control the operating status of the box and thus to control the operating status of that which is plugged into the box. For example, if a light is plugged into the box, a user wearing a controlling device that comes within a certain proximity of the box may cause the lights to switch on.

In other variations, the proximity at which the controlling device may affect the controlled device may vary. There are two main ways to alter the sensitivity. The first is through the physical hardware. In particular, in the Bluetooth® embodiments, there are different "classes" of Bluetooth. They in many ways correspond to physical power put into the antennas. All are interoperable, and can pair with one another. The second way is a more software-based approach, which depends on the strength of the received signals, e.g., using the RSSI measure, which works for 802.11 wireless protocols. Using RSSI, the user can specify for each device how far the proximity distance is. That is, a user can set their controlling device at what they desire to be the periphery of the detection zone.

While Bluetooth® has been described above as an exemplary type of wireless transmission scheme, it will be understood that other types of wireless transmission schemes may also be employed. Where Bluetooth® is employed, one type of Bluetooth® device is a Class 2 Version 1.2 (IEEE 802.15.1-2005) device, but other types will also be understood to be of use.

Example

A device, using Bluetooth® connectivity, was constructed using a prototyping board that was meant to emulate the integrated hardware that would exist in a technology that had implemented the ability to work with the device. In this case, the application of a light switch that controls 5-volt police lights was used for demonstration. The prototyping device had the capacity to pair with any device that was visible with a Bluetooth® address (in this case, an iPhone®). When the iPhone® was present, the lights would turn on and remain on. When the iPhone® was gone, or its signal was interrupted, the lights turned off. This was done using only Bluetooth® address filtering (Level 1), as this application does not demand more security. The device was tested and was able to successfully pair, turn on/maintain the lights, and turn off the lights when the iPhone® was out of range or its signal was terminated or impeded. This indicates that a device can be constructed to regulate a light switch on the basis of whether or not a pre-paired Bluetooth® device is present, indicating presence of the user.

An exemplary device was built with the following materials:

Regulator:
1. 1 Parallax Board of Education prototyping board.
2. 1 A7 Embedded Blue 500 (eb500) Bluetooth® module
3. 1 Parallax BASIC Stamp 2 (BS2) microcontroller
4. 8 jumper wires
5. 1 227Ω resistor, 1 10 kΩ resistor
6. 1 9 VDC, 300 mA Power Supply Light:
1. 2 sets of Woot Woot-Off USB lights
2. 2 USB extender cables with data wires stripped out and soldered to jumper wires.

Wearable Device:
1. Apple® iPhone® with Bluetooth® enabled, or Dell® Axim® Pocket PC®

Testing Devices:
1. 2 Nested Aluminum Boxes or steel container, Fujitsu Lifebook N series Laptop
2. Kensington K33902US Class 2 Bluetooth USB Adapter A testing procedure for the exemplary device was as follows:

To test the efficacy of the Bluetooth® light switch regulator, it first established a relationship with an Apple® iPhone®. Because this application required only Level 1 security, the iPhone® was not involved in the actual relationship. Rather, the light switch regulator recorded the Bluetooth® address of the iPhone® using the push-button functionality built into the device to allow it to establish relationships. Once the two devices had established relationships, the iPhone® was kept in discoverable mode to allow the light switch regulator to see it. In order to test the ability for the light switch to be regulated, the iPhone® was removed from the vicinity of the switch. For the purposes of an easier test that can be replicated as a demonstration without walking away, the iPhone® was also placed into an Aluminum box inside of another, which screened out the Bluetooth® frequency.

The results of the testing were as follows:

After testing was complete, it was determined that the device that controlled the lights was able to establish a relationship with the iPhone® and other Bluetooth®-enabled devices. After this relationship was established, the light switch was able to remain on as long as the iPhone®'s Bluetooth® address was visible. Finally, when the iPhone® was removed from the switch's general vicinity (about 40 feet in this test), the lights turned off. Additionally, the more practical test of impeding Bluetooth® signal using nested metal boxes also proved to be effective and the lights turned off. Once the device was back in range, or the signal was no longer impeded, the light switch turned back on and remained on.

One may analyze the results in this way:

The results of the testing show that it is possible to create a device that, using Bluetooth®, is able to regulate a light. The light switch demonstrates non-encrypted, low-security applications. Other applications include using secure and more intelligent iterations of this device. The Pocket PC® allows use of the SPP (serial port profile) for Level III.

Conclusion:

The testing showed that it is possible to create a device that regulates a light that can be activated and deactivated on the basis of whether or not a pre-set Bluetooth® device was present. By extension, this means that a light switch can be on or off based on whether its user is present. Level II and III applications may be employed to, e.g., lock a computer and as an additional factor of authentication. Also, during testing, it was found that the range of the light switch regulator was found to be very long, which can be mitigated through an integrated hardware solution. An Application Programming Interface (API) may be employed to allow others to easily incorporate the device into existing systems.

The methods shown and described above may be implemented in one or more general, multi-purpose, or single-purpose processors.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

The system and method may be fully implemented in any number of computing devices. Typically, instructions are laid out on computer-readable media, generally non-transitory, and these instructions are sufficient to allow a processor in the computing device to implement the method of the invention. The computer-readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file-storing medium. The outputs may be delivered to a user by way of a video graphics card or integrated graphics chipset coupled to a display that may be seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or wi-fi-connected device downloads a copy of the application to their device from a server using a wireless Internet connection. The application may download over the mobile connection, or over the WiFi or other wireless network connection. The application may then be run by the user.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers. In some cases, such communications have been termed herein "signal communications", whether occurring in a wired or wireless fashion, including by means of optical communications.

The word "exemplary" is used herein to mean serving as an example, instance, or illustration. Any implementation or aspect thereof described herein as "exemplary" is not necessarily to be constructed as preferred or advantageous over other implementations or aspects thereof.

While the particular method, apparatus, and use of presence detection as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

As it is understood that embodiments other than the specific embodiments described above may be devised without departing from the spirit and scope of the appended claims, it is intended that the scope of the subject matter herein will be governed by the following claims.

The invention claimed is:

1. A system for controlling a device, comprising:
a first Bluetooth device comprising a controller, the controller including at least a first non-transitory computer-readable medium, the first non-transitory computer-readable medium comprising instructions for causing the controller to perform the following steps:
broadcasting a plurality of sequential signals, the sequential signals indicating at least a device address of the controller;
receiving a broadcasted signal from a controlled device of a second Bluetooth device, the broadcasted signal from the controlled device indicating at least a device address of the controlled device and a pairing security level required of a pairing relationship with the controlled device;
determining if the controller and controlled device have established a prior pairing relationship;
if the controller and controlled device have established a prior pairing relationship, then re-establishing a pairing relationship, whereby the controlled device is caused to enter a first operating mode where a function is performed, wherein the function is selected from a group comprising authenticating a user on a computer or operating a switch; and
if the controller and controlled device have not established a pairing relationship previously, then
establishing a pairing relationship between the controller and controlled device, the pairing relationship associated with the pairing security level, whereby the controlled device is caused to enter the first operating mode, such that upon absence of a received broadcasted signal from the controller, the controlled device enters a second operating mode in which the function is not performed;

a second non-transitory computer-readable medium, the second non-transitory computer-readable medium comprising instructions for causing the controlled device to broadcast a signal indicating at least a device address of the controlled device and a pairing security level required of the pairing relationship with the controlled device;

such that, if the controller and the controlled device establish a pairing relationship, the pairing relationship is associated with the pairing security level, wherein the pairing security level is an encrypted connection which changes to an unencrypted connection based on a device address after a period of time; and such that if during a time when the pairing security level is maintained with an encrypted connection, a presence is detected of a third Bluetooth device requesting pairing with the controlled device at a second or third pairing security level, the pairing security level of the paired controller and controlled device is lowered to the pairing security level having an unencrypted connection for a temporary allotted period of time without entering the second operating mode.

2. The system of claim 1, wherein the controller includes a controlling circuit where the controlling circuit includes a signal transmitter, and wherein the second non-transitory computer readable medium operates a controlled circuit and where the controlled circuit includes a signal receiver.

3. The system of claim 2, wherein the controlling circuit secures the controlled circuit, or an application running on a system including the controlled circuit, against unauthorized access.

4. The system of claim 2, wherein the controlling circuit is configured to be wearable by a user.

5. The system of claim 2, wherein the signal transmitter is configured to send an encryption key to the controlling circuit.

6. The system of claim 2, wherein the signal transmitter and the signal receiver operate using a Bluetooth transmission scheme.

7. The system of claim 2, wherein the controlling circuit and the controlled circuit are configured to be in signal communication when the distance between the signal transmitter and the signal receiver is less than 15 feet.

8. The system of claim 2, wherein the controlling circuit forms a portion of a dedicated device.

9. The system of claim 2, wherein the controlling circuit forms a portion of a watch, a PDA, or a mobile phone.

10. The system of claim 1, wherein the instructions for causing the controller to perform steps forms a portion of an application for a PDA, tablet computer, or mobile phone.

11. A system for controlling a device, comprising:
a first non-transitory computer readable medium, comprising instructions for causing a first Bluetooth device to pair with a second Bluetooth device when executed by a processor; and a second non-transitory computer readable medium, comprising instructions for causing the second Bluetooth device to pair with the first Bluetooth device when executed by a processor, the second Bluetooth device performing a function when paired with the first Bluetooth device, wherein the function is selected from a group comprising authenticating a user on a computer or operating a switch;

such that if the second Bluetooth device asserts a first pairing security level requiring only a Bluetooth address, and if the first Bluetooth device pairs with the second Bluetooth device, then the second Bluetooth device is caused to perform the function; and such that if the second Bluetooth device asserts a second pairing security level requiring encryption, and if the first Bluetooth device pairs with the second Bluetooth device using encryption, then the second Bluetooth device is caused to perform the function;

and wherein if the second Bluetooth device asserts a third pairing security level requiring encryption, and if the first Bluetooth device pairs with the second Bluetooth device using encryption, then the second Bluetooth device is caused to perform the function and then to maintain the pairing security level at the third pairing security level, and if during a time when the pairing security level is maintained at the third pairing security level, a presence is detected of a third Bluetooth device requesting pairing with the second Bluetooth device at the second or third pairing security level, the pairing security level of the first and second paired Bluetooth devices is lowered to the first pairing security level for a temporary allotted period of time without entering a mode that does not perform the function.

12. The system of claim 11, wherein if the second Bluetooth device asserts the second pairing security level requiring encryption, and if the first Bluetooth device pairs with the second Bluetooth device using encryption, then the second Bluetooth device is caused to perform the function and then to change the pairing security level to the first pairing security level.

13. The system of claim 11, wherein the temporary allotted period of time is between 5 and 30 seconds.

14. The system of claim 11, wherein the first Bluetooth device is a Bluetooth-enabled pin, a Bluetooth-enabled watch, or a Bluetooth-enabled mobile phone.

15. The system of claim 14, wherein the second Bluetooth device is a computer, and wherein the function is to allow access to the computer.

16. The system of claim 14, wherein the second Bluetooth device comprises a light, and wherein the function is to turn on the light.

17. The system of claim 14, wherein the second Bluetooth device comprises a door, and wherein the function is to unlock or allow access to the door.

18. A system for controlling a device, comprising:
a first Bluetooth device comprising a controlled device, the controlled device including at least a non-transitory computer-readable medium, the non-transitory computer-readable medium comprising instructions for causing the controlled device to broadcast a signal indicating at least a device address of the controlled device and a pairing security level required of a pairing relationship with the controlled device;

such that, if the controlled device establishes a pairing relationship with a controller of a second Bluetooth device, the pairing relationship is associated with a pairing security level, and wherein the pairing security level is an encrypted connection which changes to an unencrypted connection based on a device address after a period of time, and wherein if the controlled device establishes the pairing relationship with the controller, a function is performed, the function selected from a group comprising authenticating a user on a computer or operating a switch; and such that if during a time when the pairing security level is maintained with an encrypted connection, a presence is detected of a third Bluetooth device requesting pairing with the controlled device at a second or third pairing security level, the pairing security level of the paired controller and controlled device is lowered to the unencrypted connection for a temporary allotted period of time without entering a mode that does not perform the function.

19. A system for controlling a device, comprising:
a first Bluetooth device comprising a controller, the controller including at least a first non-transitory computer-readable medium, the first non-transitory computer-readable medium comprising instructions for causing the controller to perform the following steps:
  broadcasting a plurality of sequential signals, the sequential signals indicating at least a device address of the controller;
  receiving a broadcasted signal from a second Bluetooth device comprising a controlled device, the broadcasted signal from the controlled device indicating at least a device address of the controlled device and a pairing security level required of the pairing relationship with the controlled device;
  determining if the controller and controlled device have established a prior pairing relationship;
  if the controller and controlled device have established a prior pairing relationship, then re-establishing a pairing relationship, whereby the controlled device is caused to enter a first operating mode performing a function, wherein the function is selected from a group comprising authenticating a user on a computer or operating a switch; and
  if the controller and controlled device have not established a pairing relationship previously, then
    a function, wherein the function is selected from a group comprising authenticating a user on a computer or operating a switch; relationship between the controller
    and the controlled device, the pairing relationship associated with a pairing security level, whereby the controlled device is caused to enter the first operating mode, such that upon the absence of a received broadcasted signal from the controller, the controlled device enters a second operating mode in which the function is not performed;
    such that, if the controller and the controlled device establish a pairing relationship, the pairing relationship is associated with the pairing security level, and wherein the pairing security level is an encrypted connection which changes to an unencrypted connection based on a device address after a period of time; such that if during a time when the pairing security level is maintained with an encrypted connection, a presence is detected of a third Bluetooth device requesting pairing with the controlled device at a second or third pairing security level, the pairing security level of the paired controller and controlled device is lowered to the unencrypted connection for a temporary allotted period of time without entering the second operating mode.

20. A method of controlling a device, comprising:
establishing a pairing relationship between a first Bluetooth device comprising a controller and a second Bluetooth device comprising a controlled device;
wherein the pairing relationship is associated with a pairing security level, and wherein the pairing security level is an encrypted connection which changes to an unencrypted connection based on a device address after a period of time, causing the controlled device to enter a first operating mode performing a function, wherein the function is selected from a group comprising authenticating a user on a computer or operating a switch; and
wherein if the controller and the controlled device become separated by greater than a first proximity wherein the pairing relationship is destroyed, causing the controlled device to enter a second operating mode not performing the function; and
such that if during a time when the pairing security level is maintained with an encrypted connection, a presence is detected of a third Bluetooth device requesting pairing with the controlled device at a second or third pairing security level, the pairing security level of the paired controller and controlled device is lowered to the unencrypted connection for a temporary allotted period of time without entering the second operating mode.

* * * * *